United States Patent [19]

Mathews

[11] Patent Number: 5,687,046
[45] Date of Patent: Nov. 11, 1997

[54] VERTICAL RECORDING USING A TRI-PAD HEAD

[75] Inventor: Harlan Mathews, Boulder, Colo.

[73] Assignee: Maxtor Corporation, Longmont, Colo.

[21] Appl. No.: 565,642

[22] Filed: Nov. 29, 1995

Related U.S. Application Data

[63] Continuation of Ser. No. 249,168, May 25, 1994, abandoned.

[51] Int. Cl.⁶ .......................... G11B 5/127; G11B 5/147
[52] U.S. Cl. .......................... 360/126; 360/125
[58] Field of Search .......................... 360/126, 103, 360/104, 119, 122, 125

[56] References Cited

U.S. PATENT DOCUMENTS

| | | | |
|---|---|---|---|
| 3,313,889 | 4/1967 | Machinski | 360/122 |
| 4,639,803 | 1/1987 | Takeda et al. | 360/103 |
| 4,709,284 | 11/1987 | Endo et al. | 360/103 |
| 4,835,640 | 5/1989 | Endo et al. | 360/103 |
| 4,948,460 | 8/1990 | Sandaiji et al. | 156/630 |
| 5,041,932 | 8/1991 | Hamilton | 360/104 |
| 5,111,351 | 5/1992 | Hamilton | 360/104 |
| 5,175,658 | 12/1992 | Chang et al. | 360/103 |
| 5,267,104 | 11/1993 | Albrecht et al. | 360/97.02 |
| 5,296,982 | 3/1994 | Terada et al. | 360/103 |
| 5,296,992 | 3/1994 | Abe | 360/126 |

*Primary Examiner*—Robert S. Tupper
*Assistant Examiner*—Adriana Giordana
*Attorney, Agent, or Firm*—Sheridan Ross P.C.

[57] ABSTRACT

A vertical recording head structure combines a tri-pad shaped slider body with a uniquely shaped thin-film recording element disposed along a trailing edge of the slider body. The recording element, or transducer, includes a narrow probe tip for writing data to a rotating magnetic disk. The recording element also includes a wide permalloy area to distribute the magnetic field returning from the disk. The wide area spreads the magnetic field lines such that the returning flux is kept from unintentional writing or reading information. The size and orientation of the air-bearing surfaces on the tri-pad slider body causes the slider to assume a flying attitude wherein the leading edge is lifted above the rotating magnetic disk, and the trailing edge is in substantial contact with the disk, during data transfer operations.

11 Claims, 3 Drawing Sheets

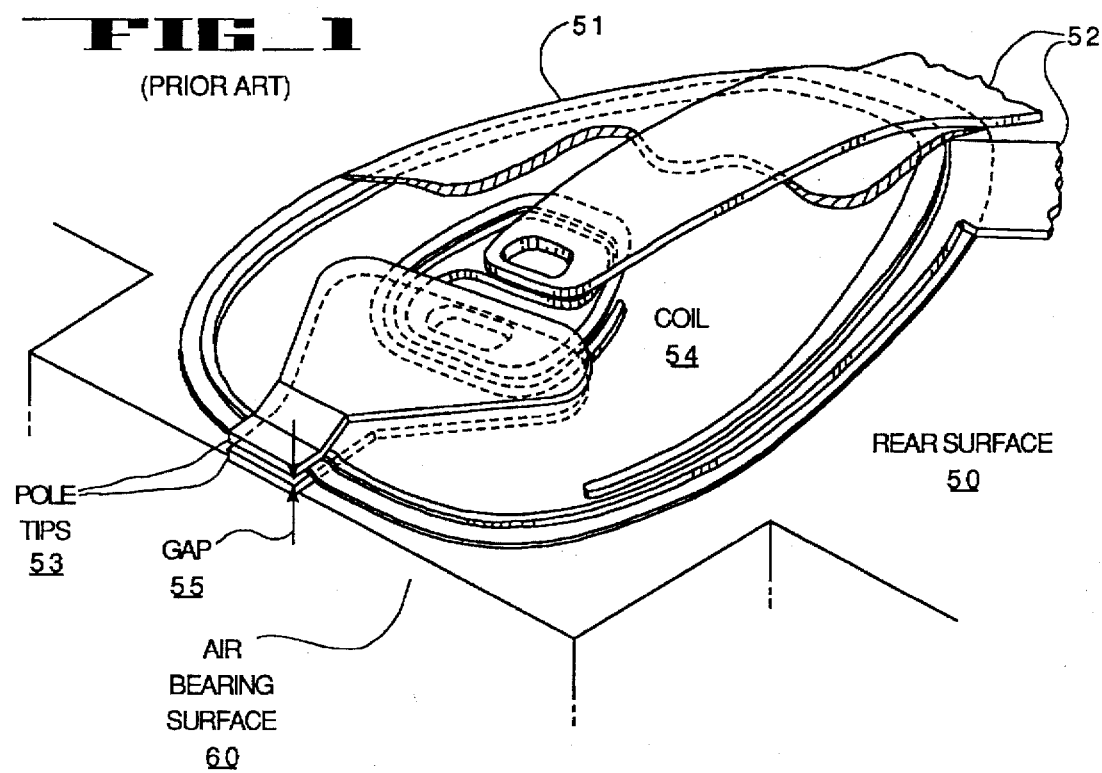
FIG_1 (PRIOR ART)
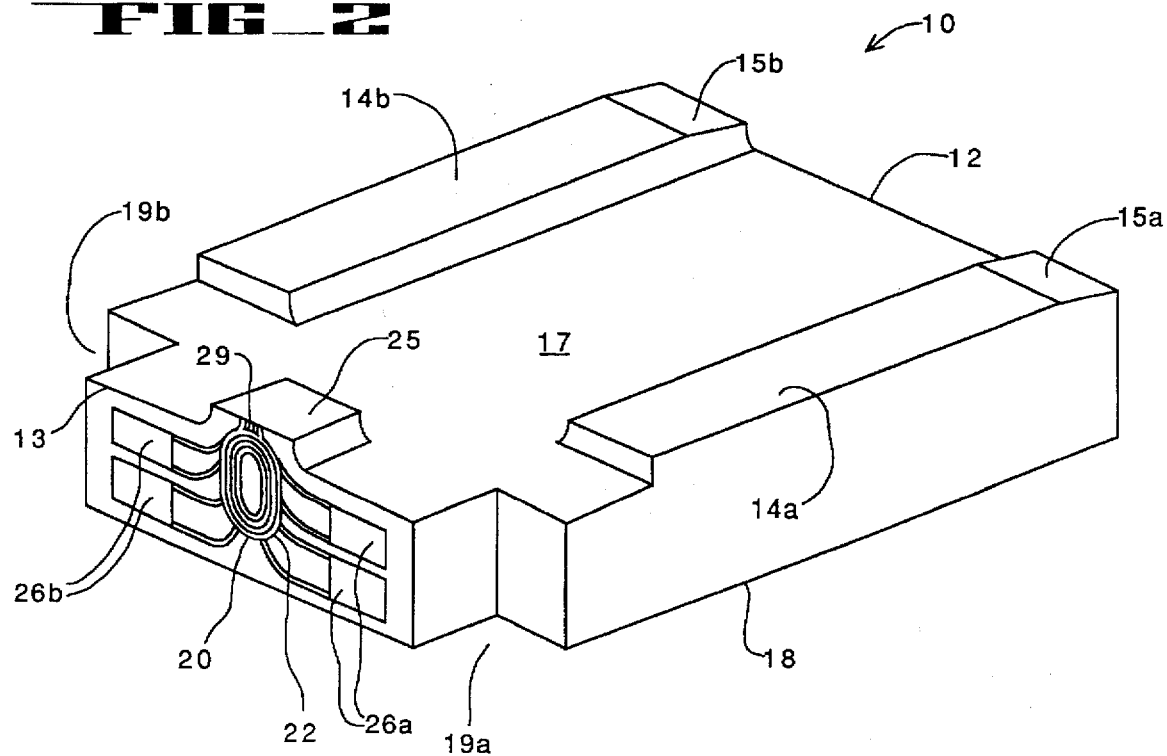
FIG_2

FIG_3
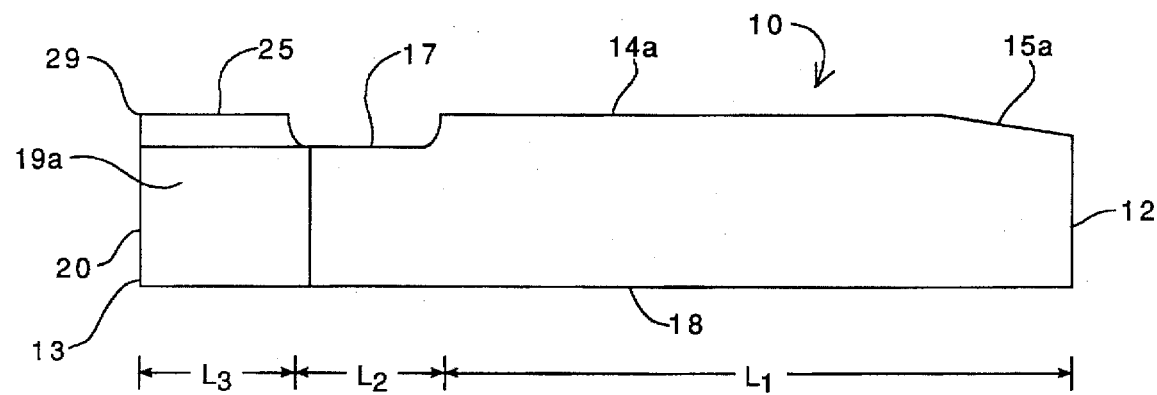
FIG_4
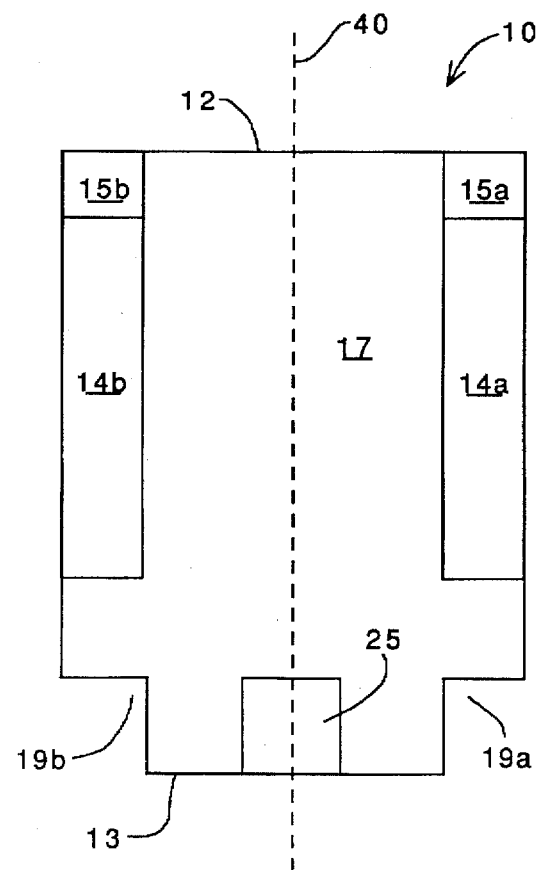

FIG_5
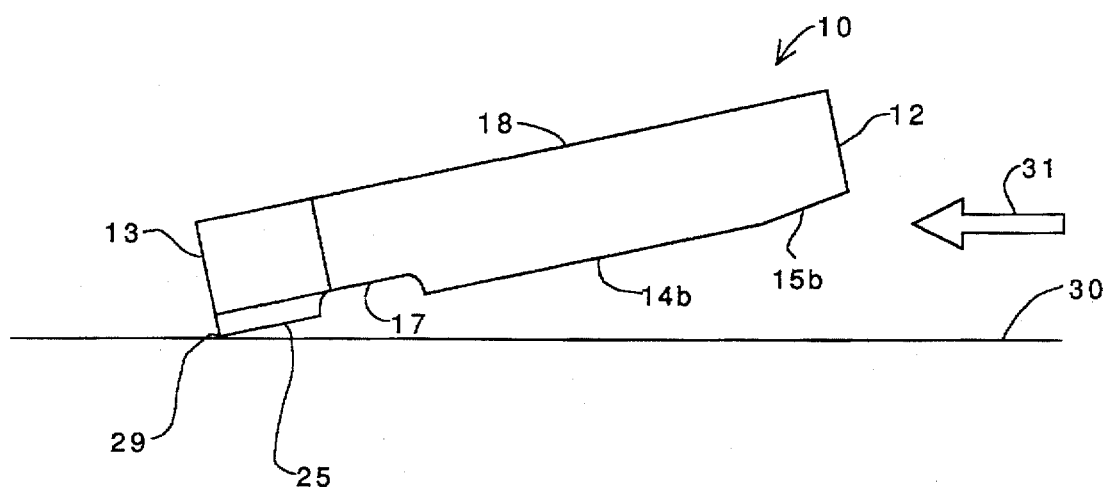
FIG_6
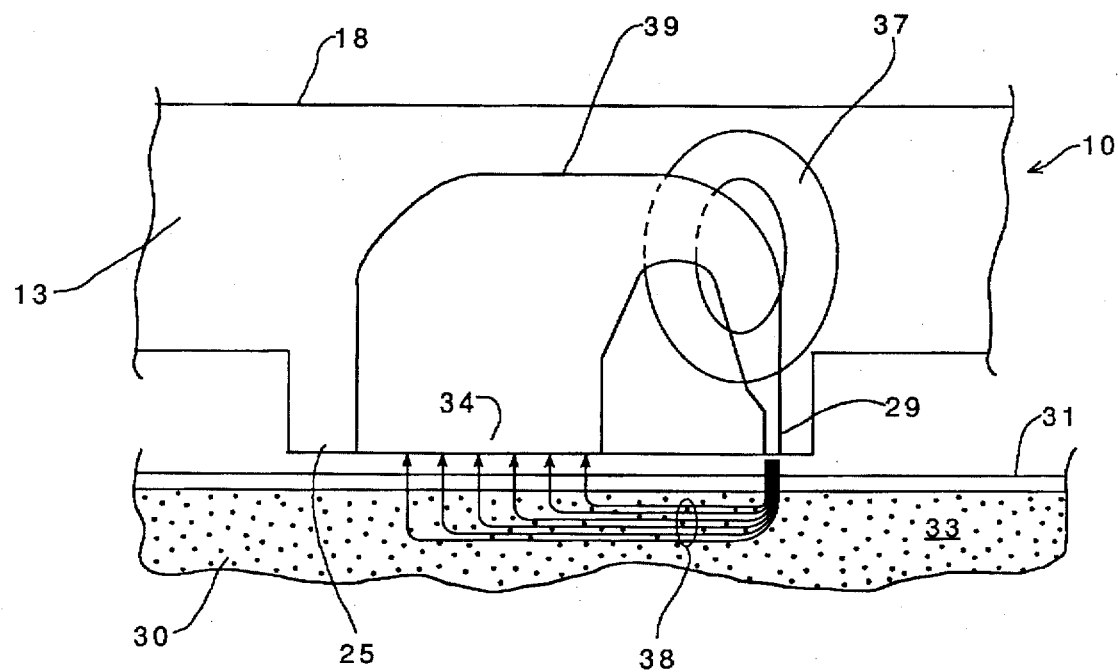

5,687,046

VERTICAL RECORDING USING A TRI-PAD HEAD

This is a continuation of application Ser. No. 08/249,168, filed May 25, 1994, and now abandoned.

FIELD OF THE INVENTION

The present invention relates to the field of magnetic recording heads and, in particular, to magnetic recording head designs that are suitable for recording on perpendicularly-oriented recording layers.

BACKGROUND OF THE INVENTION

Traditionally, magnetic recording systems have been manufactured using annular rigid magnetic disks that are rotated by a motor. The rotation causes a transducer or magnetic head to be aerodynamically lifted above the surface of the recording medium. This aerodynamic lifting phenomena results from the flow of air produced by the rotating magnetic disk; it is this air flow which causes the head "fly" above the disk surface.

In a conventional head, also referred to as a slider, elongated rectangular rails are disposed on the slider body to provide an air-bearing surface that supports the head as it flies over the relatively moving disk surface. Examples of magnetic recording heads having this type of slider structure are shown in U.S. Pat. Nos. 4,639,803 and 4,709,284.

In these types of recording heads, the transducer or recording element is often disposed along the trailing edge of the slider body in alignment with one or more of the slider rails. A variety of techniques are known, such as thin-film magnetic recording head technology, for fabricating the transducer of the recording element. By way of example, a method for making a thin-film magnetic head is disclosed generally in U.S. Pat. No. 5,175,658.

In a traditional magnetic recording playback system, current is passed through a coil to generate flux lines of magnetism that are then used to permanently magnetize a hard magnetic material. This permanently magnetized material can, in turn, induce a voltage in a magnetic recording head through detection of the magnetic flux lines emanating from the magnetic medium. Generally, a single head is used for both read and write functions. Conventional recording systems in this type are commonly referred to as horizontal or longitudinal recording systems.

Recently, much attention has been focused on perpendicular or vertical recording. In vertical recording, the direction of magnetization is oriented normal to the plane of the medium. That is, the magnetic field directions are perpendicular to the surface of the magnetic disk, whereas in horizontal recording, the magnetic domains are parallel to the disk surface. Orienting the fields of magnetization in a perpendicular direction has the advantages of reduced self-demagnetization and very well defined data cell boundaries; thus, theoretically smaller cell sizes. A description of a magnetic read/write head structures which has application in a vertical recording system is found in U.S. Pat. No. 5,111,351, of Hamilton.

The electromagnetic read/write integrated head structures described in the Hamilton patent suffer from the drawback of being extremely difficult to manufacture reliably. In addition, consistent head performance with acceptable wear rates has been difficult to achieve in these vertical recording structures.

What is needed then is an alternative vertical recording head structure which overcomes the drawbacks of the prior art. As will be seen, the present invention provides a practical, alternative vertical recording head structure which can be reliably manufactured utilizing existing fabrication technologies.

SUMMARY OF THE INVENTION

The present invention covers a vertical recording head comprising a tri-pad shaped slider body in combination with a uniquely designed thin-film head element. The recording element, also known as a transducer, includes a narrow probe tip for transferring information to a rotating magnetic disk. The recording element further includes a wide permalloy region that distributes the magnetic flux returning from the disk surface. This wide region spreads the returning magnetic field lines such that unintentional writing or reading of information is prevented.

In one embodiment of the invention, a recording head is provided for transferring information to a rotating magnetic disk. The recording head includes a slider having a leading edge facing the direction of relative motion between the head and the disk. The slider also includes a bottom and a trailing edge. A pair of rails and a rear pad extend down from the bottom of the slider. The rails include air-bearing surfaces which extend from the leading edge of the slider towards the trailing edge. The rear pad is located nearest the trailing edge. The orientation of the air-bearing surfaces and the rear pad is such that the slider body assumes a flying attitude with the leading edge being lifted above the rotating magnetic disk, while the trailing edge remains in substantial contact with the disk, during reading/writing operations.

A thin-film transducing element is disposed along the trailing edge of the slider. The transducing element includes a Permalloy layer Permalloy designating a NiFe alloy, and a coil for generating a magnetic flux in the Permalloy layer when the coil is energized. For example, during writing of data to the disk, magnetic flux emanates from the narrow probe tip of the Permalloy layer. This concentrated magnetic flux passes vertically through the magnetizing layer of the rotating disk. The flux path flows horizontally through the magnetic underlayer of the disk and returns to the head via the wide flux return region. Because the flux return region has a substantially larger area as compared to the probe tip, the magnetic field lines are distributed in the return path through the disk's magnetizing layer.

BRIEF DESCRIPTION OF THE DRAWINGS

The present invention is illustrated by way of example and not limitation in the figures of the accompanying drawings, in which like references indicate similar elements, and in which:

FIG. 1 is a schematic of a prior art thin-film recording head.

FIG. 2 is a perspective view of the vertical recording head structure of the present invention.

FIG. 3 is a side view of the recording head shown in FIG. 2.

FIG. 4 is a bottom view of the recording head shown in FIG. 2.

FIG. 5 is a side view of the vertical recording head of the present invention showing the attitude of the head during data transfer operations.

FIG. 6 is a rear view of the vertical recording head of the present invention illustrating the magnetic flux path for write operations.

DETAILED DESCRIPTION

A tri-pad vertical recording head for use in reading and writing information to a rotating magnetic disk is described.

In the following description, numerous specific details are set forth such as material types, dimensions, processes, etc., in order to provide a thorough understanding of the invention. It will be obvious, however, to one of ordinary skill in the art that the invention may be practiced without these specific details. In other instances, well-know elements and processing techniques have not been shown in order to avoid unnecessarily obscuring the present invention.

Referring to FIG. 1, there is shown a partial perspective view of a prior art thin-film head comprising a thin-film magnetic recording element 51 plated or attached to the rear surface 50 of slider body. The air-bearing surface which extends from the slider body is shown in FIG. 1 as air-bearing surface 60. Practitioners in the magnetic recording art will recognize that this type thin-film type head structure was first introduced in the IBM 3370 disk drive in 1979. The technology for manufacturing thin-film heads such as that shown in FIG. 1 is well-known in the prior art.

Thin-film recording element 51 includes a coil 54, which normally comprises a wrapped copper wire. Leads 52 provide electrical connection to each end of coil 54. Disposed about coil 54 are permalloy pole tips 53. Each of the pole tips 53 extends downward to the air-bearing surface 60, forming a gap 55 therebetween. Upon energizing coil 54 with an electrical current, magnetic flux is generated in Permalloy pole tips 53. This magnetic flux flows across gap 55 and induces a permanent magnetic change in the longitudinal or horizontal direction of the rotating magnetic recording medium.

It is appreciated by practitioners in the art that thin-film recording element 51 is commonly fabricated using well-known semiconductor fabrication techniques, wherein the final structure is plated to the rear surface 50 of the slider body. It should be understood, however, that the recording head of FIG. 1 is suitable for horizontal or longitudinal recording, but cannot be used in a vertical or perpendicularly-oriented magnetic recording system.

FIG. 2 is a perspective view of the vertical recording head 10 of the present invention. Vertical recording head 10 comprises a slider body having a bottom surface 17, a top surface 18, a leading edge 12, and a trailing edge 13. In the embodiment shown in FIG. 2, leading edge 12 is positioned to face the air flow resulting from the rotation of the magnetic recording disk; that is, leading edge 12 faces in the direction of the disk's rotation.

Conversely, trailing edge 13 is positioned at the opposite end of the slider body, facing away from the direction of rotation. Along the trailing edge 13 of recording head 10 is attached a thin-film recording element 20 which is specially designed to achieve vertical or perpendicular recording in accordance with the present invention. Magnetic recording element 20 comprises a coil 22 from which extends a probe tip 29. The end of probe tip 29 extends downward (toward the disk surface) and is coincident with the bottom surface of pad 25. Pad 25, itself, protrudes downward from bottom 17 of the slider body and is disposed along the central longitudinal axis of recording head 10. This central axis extends from leading edge 12 through trailing edge 13.

As will be described in more detail shortly, when coil 22 is electrically energized, narrow probe tip 29 causes magnetic flux to channel vertically through the magnetic layer of the rotating disk. Pairs of metal contact regions 26a and 26b located on opposite sides of coil 22 along trailing edge 13 permit electrical connection to coil 22. By way of example, ordinary wires connected to the recording channel electronics of the drive may be bonded or soldered to the individual pads 26a or 26b to provide proper electrical connection between the channel electronics and the recording head.

Note that recording head 10 further includes a pair of rectilinear side rails which extend downward from bottom surface 17. These side rails provide air-bearing surfaces 14a and 14b along opposite sides of the slider body. Air-bearing surfaces 14a and 14b extend from leading edge 12 toward trailing edge 13, but end at an intermediate point before the beginning of rear pad 25.

In addition, beveled regions 15a and 15b are located nearest leading edge 12 of respective air-bearing surfaces 14a and 14b. Beveled regions 15a and 15b assist in lifting the leading edge of recording head 10 off of the rotating disk surface during normal read/write operations.

It should also be noted that the embodiment illustrated in FIG. 2 includes notched regions 19a and 19b, disposed along trailing edge 13 directly in back of air-bearing surfaces 14a and 14b, respectively. Notched regions 19a and 19b reduce the surface area near the trailing edge of recording head 10 for reasons to explained in more detail shortly.

Referring now to FIG. 3, there is shown a side view of the vertical recording head of the present invention. As can be seen, thin-film recording element 20 is shown attached or plated along the trailing edge 13 of recording head 10. Thin-film recording element 20 includes a probe tip 29 that extends down to, and is coincident with, the surface of rear pad 25. (See FIGS. 5 & 6). Note that in FIG. 3, the bottom pad surfaces 14a, 14b, and 25 of the recording head represent the surfaces of the slider body which are closest to the rotating disk during normal operation. Thus, the side view of FIG. 3 is essentially shown inverted.

The side view of FIG. 3 also shows the air-bearing surfaces (e.g., surface 14a, including beveled edge 15a) extending from leading edge 12 toward trailing edge 13. The air-bearing surfaces terminate at a first intermediate point along the central longitudinal axis of the head. The extent of the air-bearing surfaces from leading edge 12 toward trailing edge 13 is shown by as length $L_1$ in FIG. 3.

Similarly, rear pad 25 extends from trailing edge 13 to a second intermediate point along the central longitudinal axis of the head. The length of rear pad from edge 13 is shown in FIG. 3 as length $L_3$. The space between the first and second intermediate points—i.e., between the point where air-bearing surface 14a ends and rear pad 25 begins—is represented in FIG. 3 by the length $L_2$. Further note that in the side view of FIG. 3 notched region 19a is illustrated extending from trailing edge 13 and having a length that is substantially as long as length of rear pad 25; i.e., length $L_3$.

With reference now to FIG. 4, there is shown a bottom view of the vertical recording head of the present invention. FIG. 4 illustrates rear pad 25 as being disposed along a central longitudinal axis 40 of recording head 10. Rear pad 25 is located such that one edge of its bottom surface is coincident with trailing edge 13. Disposed on opposite sides of central longitudinal axis 40 are air-bearing surfaces 14a and 14b, including beveled regions 15a and 15b, respectively. Likewise, notches 19a and 19b are shown on trailing edge 13 on opposite sides of central longitudinal axis 40. Both notches 19a & 19b, and air-bearing surfaces 14a & 14b, are disposed substantially equidistant from central longitudinal axis 40.

FIG. 5 shows the flying attitude of recording head 10 during normal read/write operations (albeit, greatly exaggerated for purposes of illustration). In FIG. 5, rotating magnetic disk 30 is shown moving in a direction from leading edge 12 toward trailing edge 13. This rotation results in air flow in the direction depicted by arrow 31. Because air-bearing surfaces 14a and 14b have a substantially larger surface area as compared to rear pad 25, the flying attitude of recording head 10 is such that leading edge 12 is lifted above the surface of disk 30.

At the same time, because the surface area of rear pad 25 located nearest trailing edge 13 is relatively smaller than that of air-bearing surfaces 14a and 14b, a portion of rear pad 25 adjacent to trailing edge 13 remains in substantial contact with the surface of disk 30. Minimizing the spacing between probe tip 29 and the magnetic disk surface achieves high information density in accordance with the vertical recording of the present invention.

Additionally, it should be noted that by including notched regions 19a and 19b in the embodiment shown, the total surface area near trailing edge 13 of recording head 10 is further reduced. As explained above, the overall reduction in surface area near the trailing edge—relative to the surface area near the leading edge—is what causes recording head 10 to have the flying attitude illustrated in FIG. 5. Essentially, the attitude of head 10 is such that the leading edge of the recording head flies above disk 30 while the portion of rear pad 25 coincident with trailing edge 13 drags across the rotating disk surface. Air-bearing rails 14a and 14b provide the surface area to lift or "fly" the leading edge above the disk surface. Because the surface area near the trailing edge of the slider is radically reduced, probe tip 29 basically skids along the surface of magnetic disk 30. Another advantage of the tri-pad vertical recording head structure of the present invention is that whereas the probe tip head is in virtually contact with the disk for maximum recording density capability, head/disk wear is minimized since only a small portion of pad 25 is in contact with disk 30.

FIG. 6 shows a rear view of the thin-film recording element, including probe tip 29, plated to trailing edge 13 of recording head 10. The portion of rear pad 25 coincident with trailing edge 13 is shown to be in near contact with the surface of disk 30 for illustration purposes. (It is appreciated that in FIG. 6 disk 30 is moving out of the page relative to vertical recording head 10.)

In FIG. 6, the thin-film recording element shown plated to trailing edge 13 includes a shaped Permalloy layer 39 and a coil 37. Layer 39 and coil 37 may be fabricated in accordance with existing thin-film recording head technologies. Coil 37 functions to induce a magnetic flux in layer 39 when energized with an electrical current. This magnetic flux—shown in FIG. 6 by lines 38—emanates from probe tip 29. In this respect, probe tip 29 is intentionally made to be very narrow in order to concentrate the magnetic flux passing through magnetic recording layer 31 of disk 30. It is appreciated that the flux lines emanating from probe tip 29 represents the actual data being permanently recorded in the magnetic layer 31 of disk 30 during write operations.

After passing through magnetic layer 31, flux 38 flows through a magnetic underlayer 33 in a horizontal direction until it returns to Permalloy layer 39 under recording element via area 34. It is important to recognize that area 34 is much larger as compared to the area of probe tip 29. This larger area distributes the magnetic field such that flux lines 38 do not write (or read) information to this portion of the disk's magnetic layer. It should be apparent that during the writing process, the intention is to permanently magnetize a small portion of magnetic layer 31 in a vertical direction. Wide flux return area 34 insures that the returning flux flowing into layer 39 does not disturb previously written data or cause unintentional reading of information. In general, the flux return area 34 should have an area which is at least 10× greater than the area of the probe tip 29.

Furthermore, practitioners in the art will appreciate that a variety of fabrication techniques may be utilized to build the thin-film recording element shown in FIG. 6. For example, Permalloy layer 39 may be fabricated in relation to coil 37 such that the windings of coil 37 are wrapped about layer 39. In another embodiment, the Permalloy probe tip 29 might pass under coil 37 and come up through the middle across the top of the windings. The only requirement with respect to Permalloy layer 39 and coil windings 37 is that electrical energizing of coil 37 causes the generation of magnetic flux 38 as shown in FIG. 6.

It is appreciated that the configuration shown in FIG. 6 has a much smaller head loop area, making it much less sensitive to stray fields than prior art designs. The magnetic domain stability (i.e., wiggle) of the invented vertical recording head structure is also much less than prior art vertical recording heads due to the planer deposition process which may be employed in fabricating the thin-film recording element. Highly stable planer deposition processes result in higher margin head and higher production yields.

Whereas many alternations and modifications to the present invention will no doubt become apparent to the person of ordinary skill in the art after having read the foregoing description, it is to be understood that the particular embodiments shown and described by way of illustration are in no way intended to be limiting. For example, while the vertical recording head of the present invention has been described as having a rear pad which remains in contact with the disk surface, it is appreciated that in certain embodiments the rear pad may actually fly a small distance above the disk surface. Of course, this spacing would depend upon a number of design considerations, such as disk rotation speed, actual surface areas, etc. In any event, however, the flying attitude of the head would essentially be the same. Therefore, reference to the details of the illustrated diagrams is not intended to limit the scope of the claims which themselves recite only those features regarded as essential to the invention.

Thus, a tri-pad vertical recording head structure has been described.

I claim:

1. A recording head for transfer of data to a magnetic disk rotating in a plane, said head comprising:

a slider having a leading edge facing in a general direction of relative motion between said head and the magnetic disk, a bottom, and a trailing edge, said trailing edge having an upper end and a lower end with said lower end being closer to the magnetic disk than said upper end when said head is being used to transfer data, and said slider having a pair of air-bearing surfaces being located nearest said leading edge and a rear pad extending from said bottom, said pair of air-bearing surfaces being located nearest said leading edge and said rear pad being located near said trailing edge such that said slider is attitudinized with said leading edge flying above, and said trailing edge being in substantial contact with, the magnetic disk; and a transducing element disposed along said trailing edge, said transducing element including:

a layer formed on the trailing edge with a first pole having a probe tip with an outer edge and a second pole having a flux return area with an outer edge, said probe tip and said flux return area being spaced apart along said trailing edge by a gap, said outer edges of the probe tip and of the flux return area facing away from said gap, said layer having:

a first dimensional value defined between an inner side facing away from said trailing edge joined to said trailing edge and an opposite, outer side;

a second dimensional value defined between said probe tip and an end of said layer that is opposite said probe tip and adjacent to said upper end of said trailing edge; and a third dimensional value defined between said outer edge of said probe tip and said outer edge of said flux return area, with said third dimensional value being substantially perpendicular to said second dimensional value; and a coil around a portion of said layer for generating a magnetic flux in said layer when energized, said magnetic flux vertically passing to said probe tip in a direction substantially normal to the plane of the magnetic disk;

wherein said first dimensional value is substantially less than each of said second and third dimensional values and said third dimensional value is substantially closer in magnitude to said second dimensional value than to said first dimensional value.

2. The recording head of claim 1 wherein said layer is formed of a NiFe alloy.

3. The recording head of claim 1 wherein said flux return area is substantially larger as compared to said probe tip.

4. The recording head of claim 1 wherein said rear pad has a surface area substantially less than that of said air-bearing surfaces.

5. The recording head of claim 1 wherein said layer is plated to said trailing edge of said slider body.

6. The recording head of claim 1 wherein said layer is U-shaped.

7. The recording head of claim 1 wherein said air-bearing surfaces are rectilinear in shape.

8. The recording head of claim 1 wherein said slider body further comprises notched regions along said trailing edge.

9. The recording head of claim 1 wherein said air-bearing surfaces include a beveled front edge located adjacent to said leading edge of said slider body.

10. The recording head of claim 1 wherein said transducer element further comprises at least one pair of contacts disposed along said trailing edge providing electrical connection to said coil.

11. The recording head of claim 1 wherein said first dimensional value relates to a thickness of said layer, said second dimensional value relates to a height of said layer, and said third dimensional value relates to a length of said layer.

* * * * *